United States Patent [19]
Apgar

[11] 3,783,967
[45] Jan. 8, 1974

[54] FOCUSING PROTECTIVE ENCLOSURE FOR ULTRASONIC TRANSDUCER

[75] Inventor: Edward G. Apgar, Lexington, Mass.

[73] Assignee: The United States of America as represented by the Secretary of the Department of Transportation, Washington, D.C.

[22] Filed: Feb. 24, 1972

[21] Appl. No.: 229,084

[52] U.S. Cl. ............. 181/.5 ED, 181/31 B, 181/42, 181/63, 340/388
[51] Int. Cl. ......................................... G10k 11/06
[58] Field of Search ................. 181/42, .5 R, .5 AP, 181/.5 ED, 31 R, 31 A, 31 B, 46, 56, 58, 68, 69, 63; 310/9.1; 333/99; 340/388

[56] References Cited
UNITED STATES PATENTS

| | | | |
|---|---|---|---|
| 3,142,034 | 7/1964 | Junger | 181/.5 R |
| 3,141,520 | 7/1964 | Kurtze | 181/69 |
| 3,623,295 | 11/1971 | Shriner | 181/46 |
| 3,186,509 | 6/1965 | Dudognon | 181/31 B |
| 2,609,886 | 9/1952 | Harmon | 181/68 |

*Primary Examiner*—Benjamin A. Borchelt
*Assistant Examiner*—J. V. Doramus
*Attorney*—Herbert E. Farmer

[57] ABSTRACT

Disclosed is an enclosure for ultrasonic transducers that can either project a narrow beam of energy or receive energy within a narrow cone of angles and also protect the transducer from damage. The enclosure defines an opening that is covered with a screen mesh that permits ingress and egress of wave energy. Within the enclosure the wave energy is subjected to a plurality of reflections from conically shaped reflective surfaces that provide optical shielding for the transducer, yet maintain the planar wave characteristics. An embodiment is disclosed that passes the wave energy through a honeycomb structure to further enhance directional properties. The subject enclosure can be used as a transmitter of wave energy or a directional receiver of wave energy.

5 Claims, 4 Drawing Figures

FOCUSING PROTECTIVE ENCLOSURE FOR ULTRASONIC TRANSDUCER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

An enclosure for an ultrasonic transducer that is compact, focuses energy into a narrow beam and affords protection against environmental effects is useful in a variety of applications. For example, uses include portable aids to the blind, low altitude altimeters and underwater sonar. In addition, increased public awareness of the magnitude of the death and injury annually occurring in traffic mishaps has made automobile safety an important topic. One of the more promising approaches to automobile safety is automatically deployable passenger protection devices, for example, the "air-bag." However, it has been found that mechanical sensors mounted on automobiles do not provide a sufficiently long warning time to adequately protect the occupants of vehicles involved in high speed collisions. Thus, a reliable automatic anticipatory sensing system that can be utilized with automatic passenger protection devices is being sought. Doppler ranging systems appear well suited for collision anticipation and thus automobile safety constitutes another important potential use for a protective, focusing transducer housing. That is so because proper focusing of a beam in a Doppler collision sensor is important because a well defined beam limits the area of sensitivity so as to reduce the chance of false alarms due to "near collisions." In addition, directional receiving antennas reduce the possibility of false alarms due to spurious interfering radiation. Conventional long horn radiators provide good beam focusing but are expensive to fabricate and provide little transducer protection. In addition, long horns are bulky. Folded horns are small enough to be utilized in an automobile, however, they are far more expensive and destroy the planar wave characteristics that are desirable in Doppler systems. In addition, although some isolation of the transducer is provided by a folded horn radiator, further transducer protection is desirable. That is because a radiator mounted on the front of an automobile is exposed to an extremely hostile environment and must be substantially impervious to dust, dirt, water droplets, snow, ice, pebbles, mechanical shock and vandalism.

The purpose of this invention, therefore, is to provide a simple and compact enclosure for protecting a delicate sound transducer from environmental effects during either transmission or reception of wave energy and for focusing the wave energy into a narrow, well defined beam.

SUMMARY OF THE INVENTION

This invention is characterized by a wave energy focusing apparatus including a housing that defines an opening at one end thereof and encloses a plurality of reflective surfaces that are radially symmetrical about an axia. Each reflective surface is a conical section and composed of a wave reflective material. A transducer is disposed within the housing at a focal point. The focusing apparatus can function as a receiver or a transmitter. In the transmitter mode, sonic or ultrasonic wave energy produced by the transducer is successively reflected by the reflecting surfaces and projected as a well defined beam through the opening. Conversely, in the receiver mode only wave energy entering the opening from a predetermined relative direction is reflected by the surface so as to strike the transducer. The reflective surfaces are disposed such that the transducer is optically shielded from the opening and thus protected from objects entering the opening. In addition, the apparatus can be inexpensively fabricated in that the radially symmetrical reflective surfaces can be easily blow molded. Further advantages of this invention are derived from reflective surface configurations for which all wave energy paths are of equal length as described below. Consequently, planar characteristics of the wave energy produced by the transducer, or waves entering the opening are preserved. In addition, the apparatus is functional over a wide frequency range. Added protection is provided by a screen mesh spanning the opening that permits wave energy to travel therethrough substantially unaltered, but shields the internal structure of the focusing apparatus from flying pebbles, and wind carried debris such as papers, sand, dirt, sleet, rain, etc.

Another feature of the invention is the inclusion of a plurality of tubular guide sections, each with a tubular axis that is parallel to the axis. Wave energy entering the opening from the predetermined direction of maximum sensitivity, or emanating from the transducers in a direction such that it will ultimately emerge propagating in the preferred direction, passes through the honeycomblike group of guides in a direction parallel to the guide axes. Consequently, such energy passes through the guides substantially unaltered. However, the guides themselves are narrow and constructed of sound absorbent material so that wave energy propagating therethrough in any direction other than substantially parallel to the guide axes will strike the walls of the guides and be absorbed thereby. Thus, the plurality of guides provides further protection for the delicate transducer apparatus by dividing the path between the opening and the transducer into a plurality of small paths so as to block debris that may enter the opening should the screen the removed or damaged. In addition, it has been found experimentally that the focusing apparatus, without the tubular guides, produces radiation side lobes of reduced amplitude in directions other than the preferred beam direction. Although these lobes are of a substantially reduced amplitude, they are nevertheless undesirable. The tubular guides eliminate the undesirable lobes by passing only wave energy propagating therethrough in a direction substantially parallel to the tubular axes.

DESCRIPTION OF THE DRAWINGS

These and other features and objects of the present invention will become more apparent upon a perusal of the following description taken in conjunction with the accompanying drawings wherein.

DESCRIPTION OF THE PREFERRED EMBODIMENTS

Figure 1:
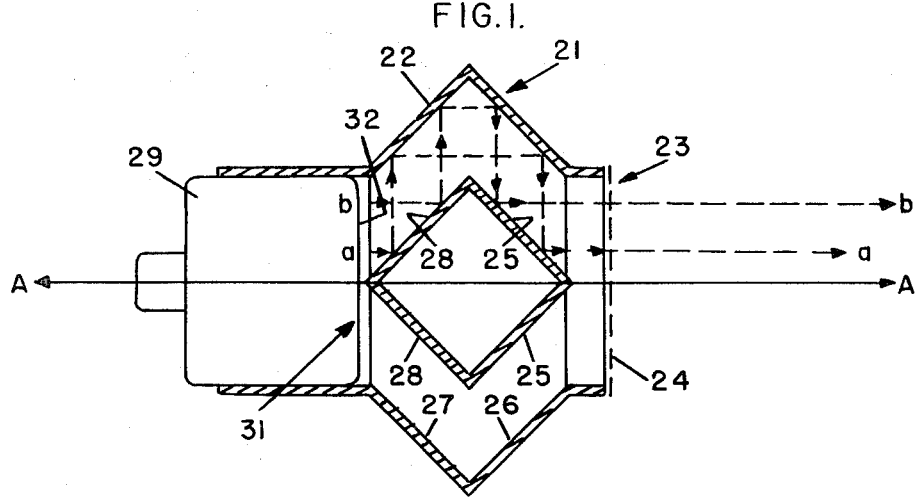
FIG. 1 is a sectional diagram of a preferred focusing enclosure in which a transducer is optically shielded.

Referring first to FIG. 1 there is shown a wave energy focusing apparatus 21 including a housing 22 that defines an opening 23 which is covered with a protective screen mesh 24. Within the housing 22 there is a plurality of reflective surfaces 25, 26, 27 and 28 that reflect wave energy. Each of the reflective surfaces 25–28 is a section of a cone and is radially symmetrical about an axis A—A. Each reflective surface 25-28 is from a right circular cone so that an intersection between a line parallel to the axis A—A and any reflective surface is at a relative angle of 45°. Consequently, wave energy travelling parallel to the axis A—A is deflected by 90° upon striking any surface 25-28. A transducer 29 is retained at a focal point 31 within the housing 22. Two typical wave energy paths a—a and b—b are shown. Assume that the paths a—a and b—b emanate from a diaphram 32 of the transducer 29 and are perpendicular thereto. Since each intersection of a path a—a or b—b and a reflective surface 25-28 results in a 90° deflection, it is seen that the pathlengths are equal. Consequently, a planar wave emanating from the diaphram 32 of the transducer 29 emerges from the opening 23 as a planar wave. In addition, wave energy emanating from the transducer 29 is focused in that only wave energy emanating in a direction parallel to the axis A—A is properly reflected toward the opening 23 to emerge as a focused beam.

During operation, the apparatus 21 can operate as a transmitter or a receiver. In the transmitter mode, the transducer converts electrical signals into sonic or ultrasonic wave energy that is initially reflected by the reflective surface 28 onto the reflected surface 27, then toward the surface 26 and finally through the opening 23 from the surface 25. This sequence may be easily seen by following either of the paths a—a or b—b. When operating in the receiver mode, wave energy entering the apparatus 21 is initially reflected by the surface 25 and follows the reverse of the path described previously. Wave energy emanating from the transducer 29 or entering the opening 23 in a direction not substantially parallel to the axis A—A is subjected to a number of reflections far exceeding the single reflection from each reflective surface 25-28 just described. Consequently, such wave energy is substantially dissipated before transversing the housing 22. Therefore, when in the transmitter mode the apparatus 21 produces a well defined beam of wave energy that propagates from the opening 23 in a direction parallel to the axis A—A, and when in the receiving mode the apparatus is only sensitive to wave energy impinging thereon from a direction substantially parallel to the axis A—A.

Figure 2:
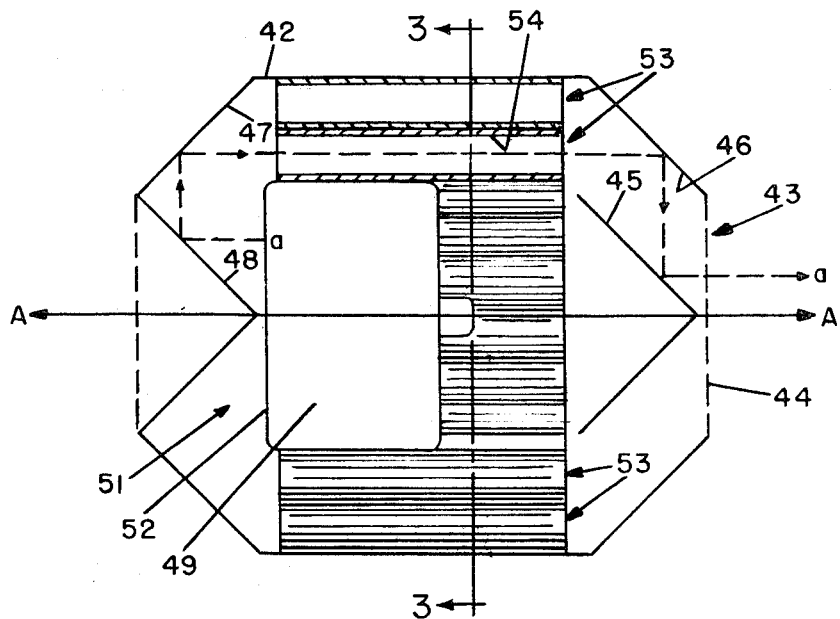
FIG. 2 is a sectional diagram of a second preferred transducer enclosure that utilizes a plurality of tubular guides in a honeycomb configuration to enhance directional characteristics.
Figure 3:
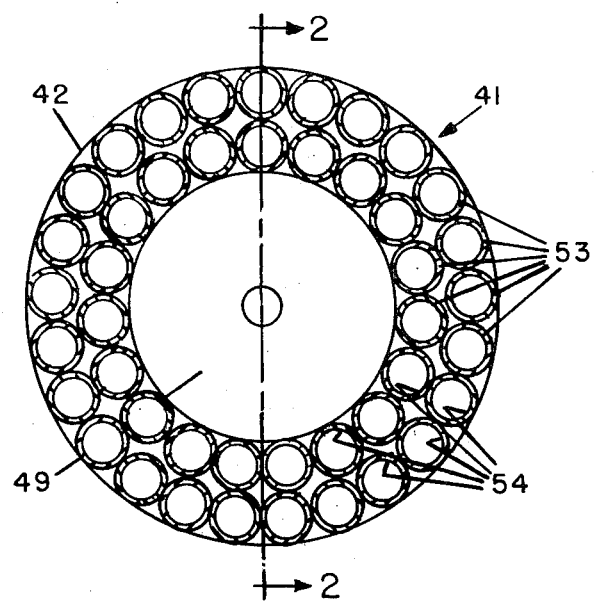
FIG. 3 is a sectional view of the enclosure shown in FIG. 2 taken along the lines 3—3.

Referring next to FIGS. 2 and 3 there is shown another preferred wave energy focusing apparatus 41 including a housing 42 that defines an opening 43 with a protective screen mesh 44 thereacross. A plurality of radially symmetrical reflective surfaces 45, 46, 47 and 48 are within the housing. Each of the reflective surfaces 45–48 is a section of a cone and each is disposed at 45° angle with respect to an axis A—A as were the surfaces 25-28 shown in FIG. 1. A transducer 49 is disposed at a focal point 51 within the housing 42. A path a—a from a rearwardly facing diaphram 52 of the transducer 49 through the opening 43 is shown. In addition, a plurality of tubular guides 53 defined by walls 54 that are made of sound absorbent material are included within the housing 42 and have their tubular axes parallel to the axis A—A.

The apparatus 41 can function as either a transmitter or receiver as could the apparatus 21. Operation is substantially similar to the operation of the apparatus 21, except that the guides 53 provide additional shielding for the transducer 49 in that the paths from the opening 43 to the diaphram 52 is divided into a plurality of small parallel paths. Therefore, objects, such as pebbles, that may enter the opening 43 following damage to the mesh 44 will be stopped before reaching the diaphram 52. In addition, the guides 53 enhance the directional characteristics of the focusing apparatus 41. This is because wave energy entering the opening 43 (in the absence of the guides 53) at a slight angle with respect to the axis A—A may still reach the diaphram 52 if the angular deviation is not great. However, in the present invention embodiment 41 most such energy will strike the walls 54 of the narrow guides 53 and be absorbed thereby. Consequently, the apparatus 41 provides a sharper focusing effect in both the receiving and transmitting modes and provides additional protection for the transducer 49.

Figure 4:
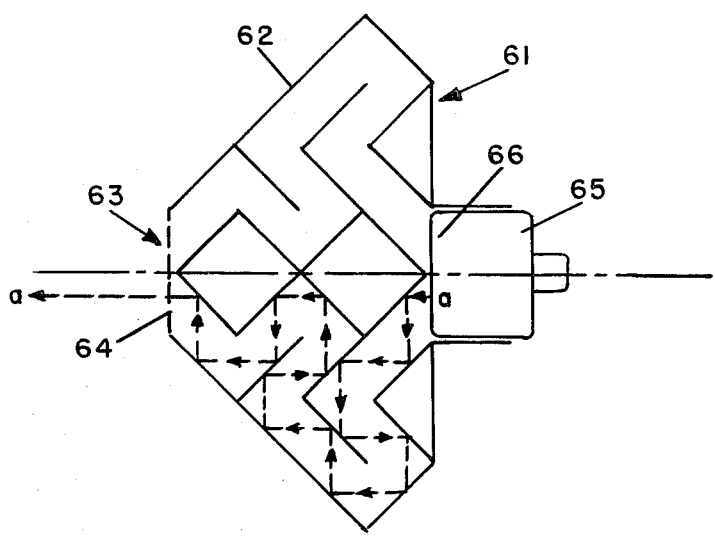
FIG. 4 is a schematic diagram illustration another preferred enclosure with a transducer therein with a much greater degree of protection from exterior influences.

Referring next to FIG. 4 there is shown another preferred wave energy focusing apparatus 61 including a housing 62 that defines an opening 63 with a protective mesh 64 thereacross. A transducer 65 located at a focal point 66 within the housing 62 is similar to the transducers 49 and 29 shown above. Within the housing 62 there is a plurality of reflective walls that subject wave energy passing between the opening 63 and transducer 65 to 16 reflections, as is easily seen by following a beam path a—a. Subjecting the wave energy to so great a number of reflections substantially enhances the directional characteristics of the apparatus 61 and provides substantially improved protection for the transducer 65. Operation is similar to the embodiment 21 previously described.

Obviously, many modifications and variations of the present invention are possible in light of the above teachings. For example, the 45° relationship between the reflective surfaces and the axis can be modified slightly to provide a magnification or reduction effect, or by choice of proper materials, the enclosure can be made functional at other frequencies up to the megahertz region. In fact, the focusing effects described become more efficient at high frequencies. It is to be understood, therefore, that the invention can be practiced otherwise than as specifically described.

What is claimed is:

1. Wave energy focusing apparatus for focusing wave energy and comprising:
    a housing means defining an opening;
    a plurality of reflector surfaces within said housing means that are radially symmetrical about a center axis and focus propagating wave energy into a beam parallel to the axis by subjecting the energy to a plurality of reflections from said reflector surfaces; and transducer means at a focal plane within said housing means;

each of said reflector surfaces being concentric and having a conical reflecting surface arranged to reflect wave energy transmitted parallel to the center axis accurately from one set of reflector surfaces to another with a mininum loss of wave energy; and each of said reflector surfaces being disposed at an angle of 45° with respect to said center axis.

2. Apparatus according to claim 1 wherein said apparatus further includes a plurality of walls parallel to said axis and defining a plurality of passages parallel to said axis.

3. Apparatus according to claim 2 wherein the geometry of said transducer means and said opening relative to said reflecting surfaces and parallel passages is arranged such that the focusing effect occurs with equal efficiency for wave motion in either direction of transmitting and receiving.

4. Apparatus according to claim 2 wherein said walls comprise a sound absorbent material.

5. Apparatus according to claim 1 further comprising mesh means across said opening and other openings through which the wave energy passes.

* * * * *